(12) United States Patent
Sonneman (10) Patent No.: US 10,030,842 B1
(45) Date of Patent: Jul. 24, 2018

(54) RING-SHAPED LIGHTS WITH EDGE EFFECT

(71) Applicant: Robert A. Sonneman, Mamaroneck, NY (US)

(72) Inventor: Robert A. Sonneman, Mamaroneck, NY (US)

( * ) Notice: Subject to any disclaimer, the term of this patent is extended or adjusted under 35 U.S.C. 154(b) by 0 days.

(21) Appl. No.: 15/499,300

(22) Filed: Apr. 27, 2017

Related U.S. Application Data (63) Continuation-in-part of application No. 29/595,090, filed on Feb. 24, 2017, now Pat. No. Des. 792,633, and a continuation-in-part of application No. 29/594,192, filed on Feb. 16, 2017, now Pat. No. Des. 792,006, and a continuation-in-part of application No. 29/592,498, filed on Jan. 31, 2017, now Pat. No. Des. 791,385, and a continuation-in-part of application No. 29/590,646, filed on Jan. 12, 2017, now abandoned.

(51) Int. Cl.
| | | |
|---|---|---|
| F21V 5/04 | (2006.01) | |
| F21S 8/06 | (2006.01) | |
| F21V 7/22 | (2018.01) | |
| F21V 17/10 | (2006.01) | |
| F21K 9/61 | (2016.01) | |
| F21Y 115/10 | (2016.01) | |
| F21Y 105/00 | (2016.01) | |

(52) U.S. Cl.
CPC .................. F21V 5/04 (2013.01); F21K 9/61 (2016.08); F21S 8/06 (2013.01); F21V 7/22 (2013.01); F21V 17/10 (2013.01); F21V 2200/20 (2015.01); F21Y 2105/00 (2013.01); F21Y 2115/10 (2016.08)

(58) Field of Classification Search
CPC .......... F21V 2200/00–2200/40; F21V 2200/20; F21K 9/61; G02B 6/0021; G02B 6/009; G02B 6/0091
USPC .................................. 362/602–605, 632–634
See application file for complete search history.

(56) References Cited

U.S. PATENT DOCUMENTS

| | | |
|---|---|---|
| D42,583 S | 6/1912 | Morgan |
| D49,562 S | 8/1916 | Bayley |
| D134,482 S | 12/1942 | Ganger |
| 3,745,327 A | 7/1973 | Lowery |
| D237,001 S | 9/1975 | Von Serda |
| D288,136 S | 2/1987 | Pfister |
| D298,059 S | 10/1988 | Muller |
| D429,835 S | 8/2000 | Hammar |

(Continued)

OTHER PUBLICATIONS

Ipparco table lamp by Neil Poulton—2012. Shown on p. 53 of the Artemide Design 2015 Catalog.(2 pages, includes front cover of catalog).

(Continued)

*Primary Examiner* — Elmito Breval
*Assistant Examiner* — Michael Chiang
(74) *Attorney, Agent, or Firm* — Gottlieb, Rackman & Reisman, P.C.

(57) ABSTRACT

A light for incorporating in a pendant includes a rim with an inner surface, a housing protecting a light source and a lens with major and minor lateral surfaces and top and bottom surfaces. Light beams from the light source (such an array of LEDs) enters the lens and hit the side of the rim. In addition, the light beams are refracted by dimples up and down from the lens.

13 Claims, 8 Drawing Sheets

(56) References Cited

U.S. PATENT DOCUMENTS

| | | |
|---|---|---|
| D541,970 S | 5/2007 | Blackman |
| D565,779 S | 4/2008 | Meise |
| D630,368 S | 1/2011 | De Rijck |
| D646,423 S | 10/2011 | Chiu |
| D655,847 S | 3/2012 | Sabernig |
| D656,653 S | 3/2012 | Sabernig |
| D666,764 S | 9/2012 | Gilad |
| D690,873 S | 10/2013 | Meise |
| D719,698 S | 12/2014 | Mollaghaffari |
| D729,430 S | 5/2015 | Poulton |
| D729,431 S | 5/2015 | Miller |
| D780,979 S | 3/2017 | Urquiola |
| 2010/0149802 A1* | 6/2010 | Chang ............... G02B 6/002 362/235 |
| 2010/0321952 A1* | 12/2010 | Coleman ............... F21S 8/04 362/607 |
| 2012/0127756 A1* | 5/2012 | Kim ............... G02B 6/0055 362/612 |
| 2012/0281432 A1* | 11/2012 | Parker ............... F21V 29/70 362/609 |
| 2012/0314449 A1* | 12/2012 | McCollum ............... G02B 6/0038 362/602 |
| 2013/0307420 A1* | 11/2013 | Yoder ............... F21V 33/006 315/158 |
| 2014/0003087 A1* | 1/2014 | Chen ............... G02B 6/0085 362/606 |
| 2016/0147009 A1* | 5/2016 | Ju ............... G02B 6/0068 362/613 |

OTHER PUBLICATIONS

LED Net Circle ceiling light fixture by Michele De Lucchi & Alberto Nason—2011. Shown on p. 53 of the Artemide Design 2015 Catalog, Found on p. 231.

* cited by examiner

RING-SHAPED LIGHTS WITH EDGE EFFECT

CROSS-REFERENCE TO RELATED APPLICATIONS

This application claims priority pursuant to 35 U.S.C. § 119 to U.S. patent application Ser. No. 29/595,090, filed Feb. 24, 2017, U.S. patent application Ser. No. 29/590,646, filed Jan. 12, 2017, U.S. patent application Ser. No. 29/592,498, filed Jan. 31, 2017, and U.S. patent application Ser. No. 29/594,192, filed Feb. 16, 2017, all of which are incorporated herein by reference in their entirety.

FIELD OF THE INVENTION

This invention pertains to a light or a pendant of several lights having a frame, a lens and a light source in the frame positioned to direct light from an edge of the lens. The light source includes preferably one or more high intensity LEDs.

BACKGROUND OF THE INVENTION

Designing lighting for a space has always been a challenge because the lighting equipment has to meet utilitarian, technical and esthetic needs. Thus, any such endeavor is successful only if technical, architectural and artistic skills are combined.

Several different types of ceiling lights are presently available, including surface mounted lights, recessed lights and hanging lights. The present invention pertains to hanging lights or other types of lights incorporating an edge effect.

SUMMARY OF THE INVENTION

The present disclosure is directed to a pendant that is supported from a ceiling or a wall that includes a light with a rim, a housing attached to the rim and a lens extending within the rim and receiving light from the light source in the housing. The light source generates a beam of light that enters edgewise into the lens and portions of it come out through an outer edge or major surface of the lens and hit the inner surface of the rim, while other portions exit through top and bottom surfaces of the lens.

In one embodiment, the housing has a lateral opening and the lens extends though the lateral opening adjacent to the light source.

In one embodiment, the lens includes a housing engaging member that is trapped in the housing to support the lens in position within the rim.

In one embodiment, lens includes a top surface and a bottom surface with dimples intercepting portions of the light beams entering the lens and projecting the light upwardly and downwardly with respect to the lens.

In one embodiment, a printed circuit board with a vertical surface is disposed in the housing. The printed circuit board includes with a plurality of LED lights directing light beams through the transparent surface into said lens. The rim and said lens are generally circular and concentric.

DETAILED DESCRIPTION OF EMBODIMENTS OF THE INVENTION

Figure 1:
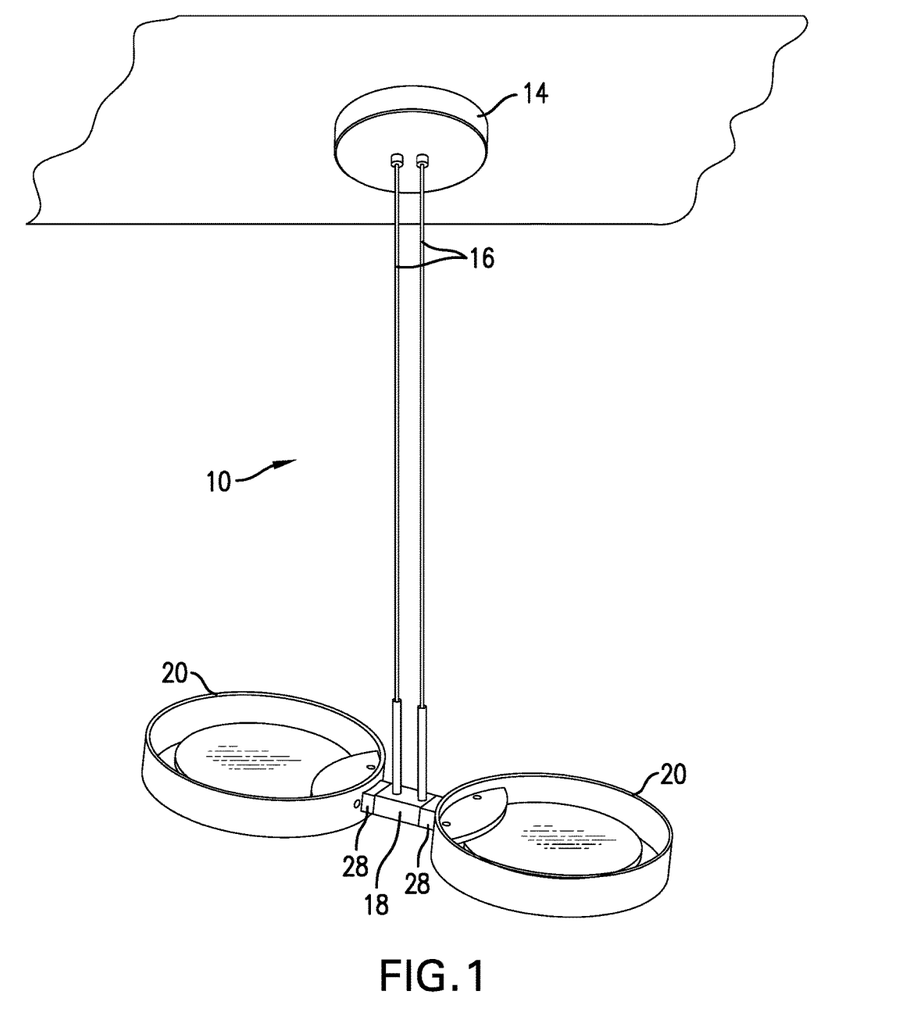
FIG. 1 shows an orthogonal view of an embodiment of a pendant with two lights constructed in accordance with the present invention.

FIG. 1 shows a pendant 10 hanging from a canopy 14 that includes two rods or wires 16 supporting and providing power to two lights 20 through a box 18.

Figure 2:
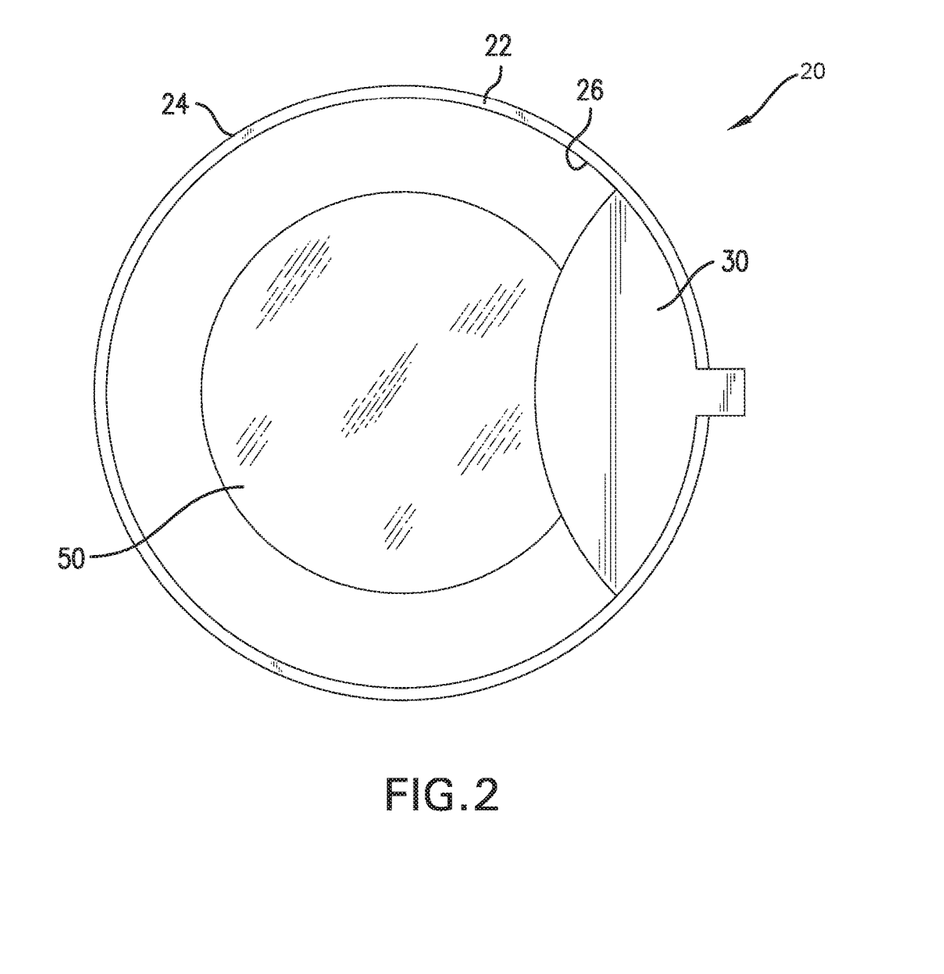
FIG. 2 shows a top view of one of the lights of FIG. 1.
Figure 3:
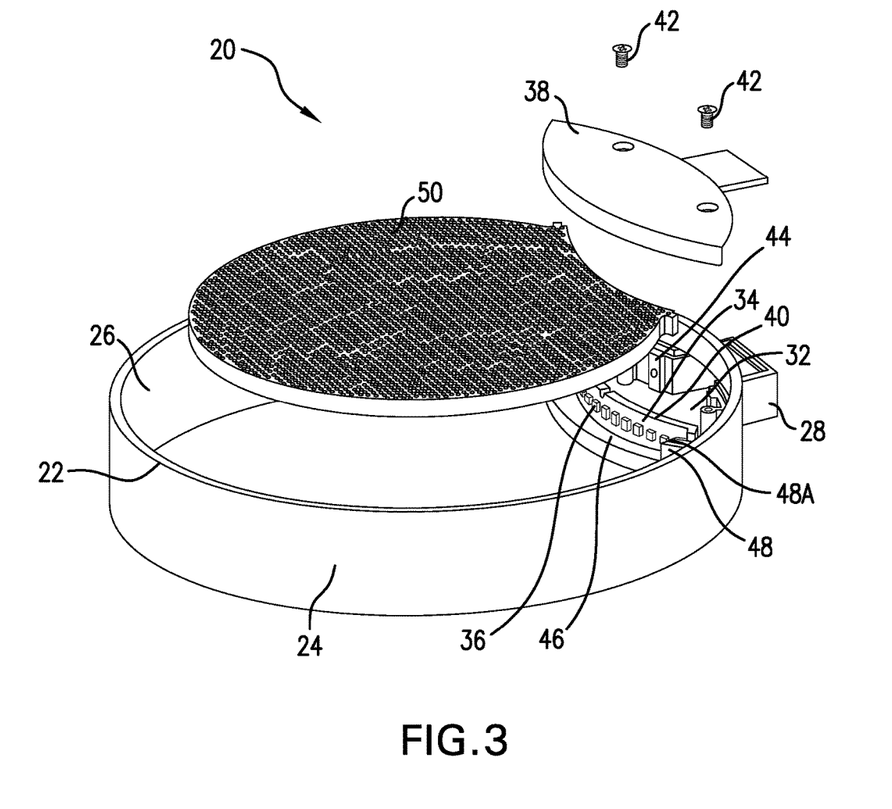
FIG. 3 shows an exploded orthogonal view of one of the lights of FIG. 1.

As shown in FIGS. 2 and 3, each light 20 includes a cylindrical rim 22. This rim 22 may be made of aluminum or other light material and has an outer surface 24 and an inner surface 26. At least the inner surface 26 (or at least a circumferential portion thereof) may be highly polished so that acts as a mirror. The outer surface 24 may also be polished, or may have a mat or a painted finish.

The rim 22 is further provided with a bracket 28 that is attached to the outer surface 24 for mounting the rim 22 and light 20. For example, in FIG. 1 the bracket 28 is disposed in the box 18. On one side, the rim 22 is formed with an arcuate housing 30.

The light 20 further includes a lens 50.

As illustrated in FIG. 3, the housing 30 includes a base 32, an arcuate circuit board 34 with an array of LEDs 36 and a cover 38. Connecters 40 extend from the circuit board 34 to the bracket 28 and are connected to wires to provide power to the circuit board 34.

The cover 38 is attached to the base 32 by screws 42 or other conventional means.

The base 32 includes an arcuate sidewall 44 rising upward to meet the cover 38 and further includes a radially extending arcuate lip 46.

The housing 30 further includes two front wall sections 48 (only one of which is being visible in FIG. 3) that each forms a chamber 48A with the ends of the circuit board 34.

Figure 4:
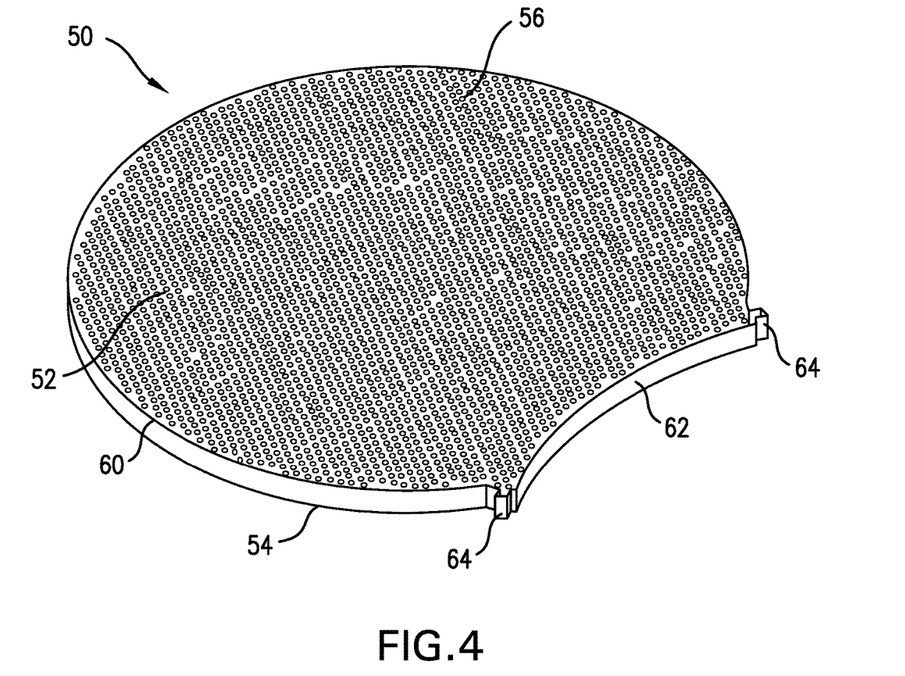
FIG. 4 shows an orthogonal view of an embodiment of a lens of the light shown in FIG. 3.

As shown in FIG. 4, the lens 50 is sized and shaped to fit inside the inner surface 26 of the rim 22. As seen in FIG. 2, preferably, the lens 50 is concentric with the rim 22. The lens 50 has a top and bottom surface 52, 54 with one or both of these surfaces 52, 54 preferably formed with a plurality of closely spaced shallow dimples 56. The dimples 56 could be square, circular, or could have other shapes and could be arranged in an array of rows and columns that are equally spaced, or could be arranged randomly.

The lens 50 further includes a major convex surface 60 and a minor concave surface 62 matching a curvature of the circuit board 34. Surfaces 60, 62 define the sides of the lens 50. The convex surface 60 is preferably translucent. For example, the surface 60 can be sandblasted so that it has milky or powdery appearance and can finished using sand blasting or other similar techniques. The minor surface 62 is preferably polished and clear so that light can enter into the lens 50. The minor surface 62 terminates laterally with two ears 64. The lens 50 is made of glass, plastic acrylic or other suitable light transmissive material.

The light 20 is assembled by placing the lens 50 inside the rim 22 so that its major surface 60 is disposed in close proximity to the surface 26 and the minor surface 62 is disposed in close proximity to, and possibly even contact with the LEDs 36. In this position, a portion of the lens 50 is resting on lip 46. The ears 64 extend into the respective chambers 48A. The cover 38 is then placed over the circuit board 34, sidewalls 48 and a minor portion of the lens 50 and the screws 42 are inserted through the cover 38 and engage threaded holes (not shown) to close the housing 30 to trap and hold the lens 50 in place.

When electric power is provided to the circuit board 34, the LEDs 36 are activated and generate light beams through the minor surface 62 toward the major surface 60. These beams generate an edge effect within the lens 50. The beams hit and illuminate the major surface 60 to provide an edge effect. The light passes through the major surface 60 of the lens 50 and is reflected by the inner surface 26 of the rim 22 with some of the beams also passing through the dimples 56 to provide an aesthetically pleasing distribution of light.

Figure 5A:
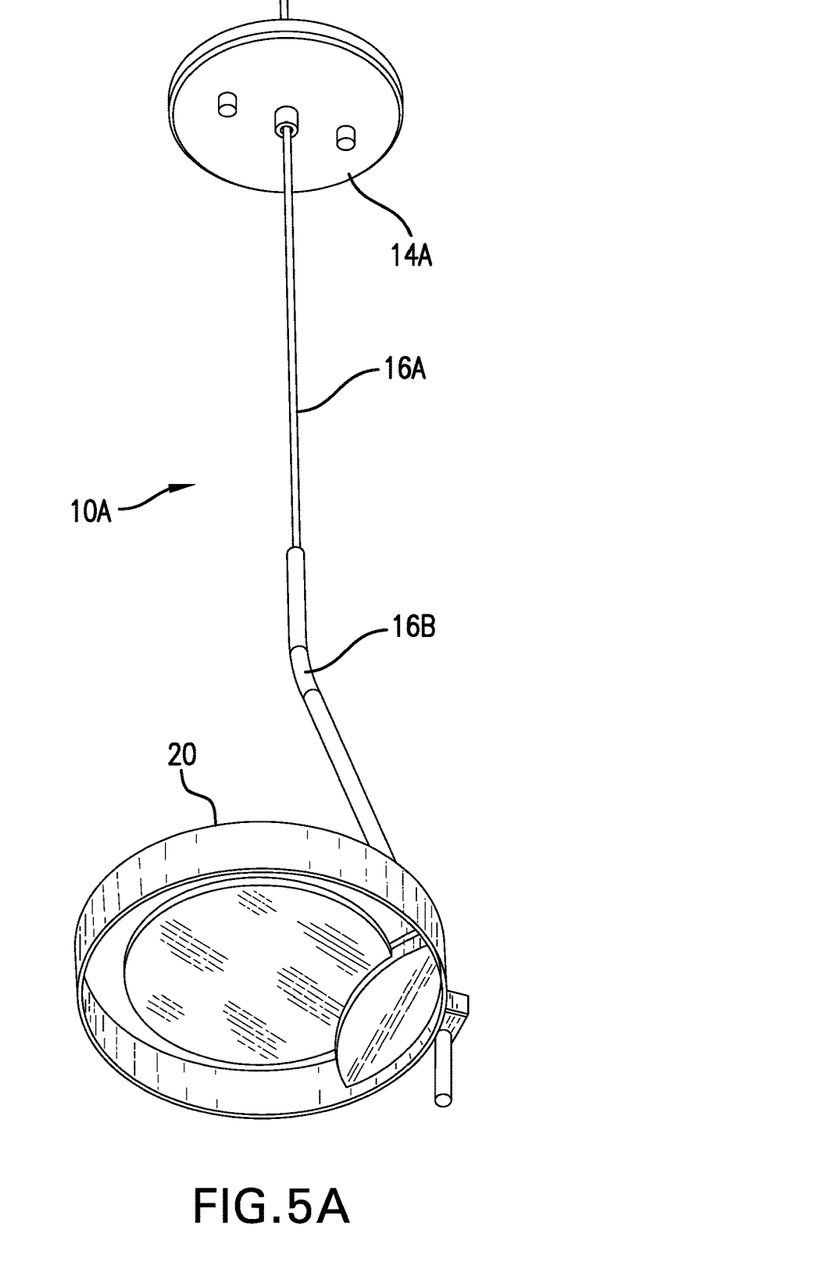
FIGS. 5A-5D show embodiments of pendants with one, three, four and nine lights respectively.

As discussed above, FIG. 1 shows a pendant 10 with two lights 20. The lights 20 can be used in other configurations as well. FIG. 5A shows a pendant 10A with a single light 20 supported from a canopy 14A by a cable 16A. A hollow offset conduit 16B is sized and shaped to hold the light 20 from its side as shown so that the light 20 is supported in a horizontal position.

Figure 5B:
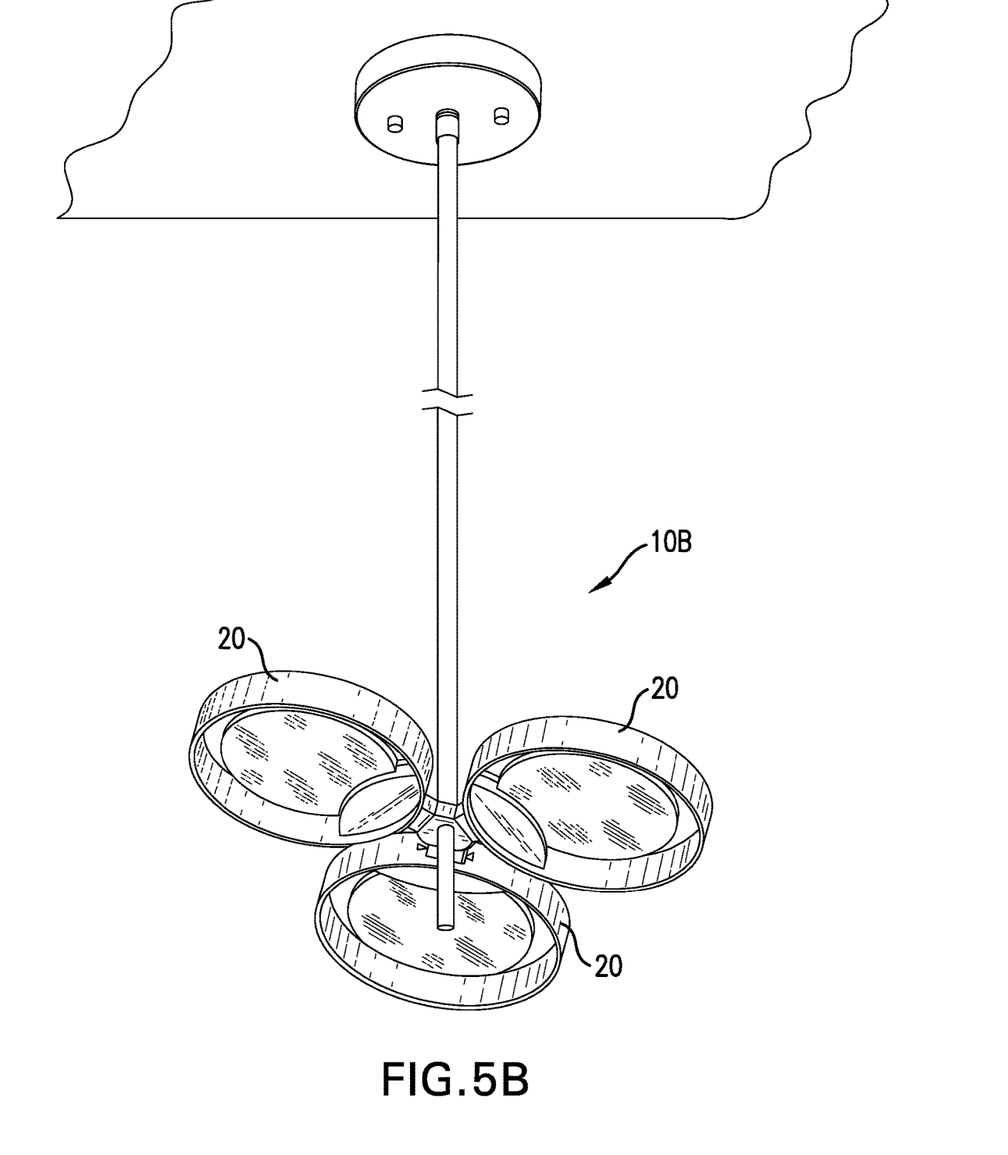

In FIG. 5B a pendant 10B is shown with three lights 20 arranged in a triangular shape.

Figure 5C:
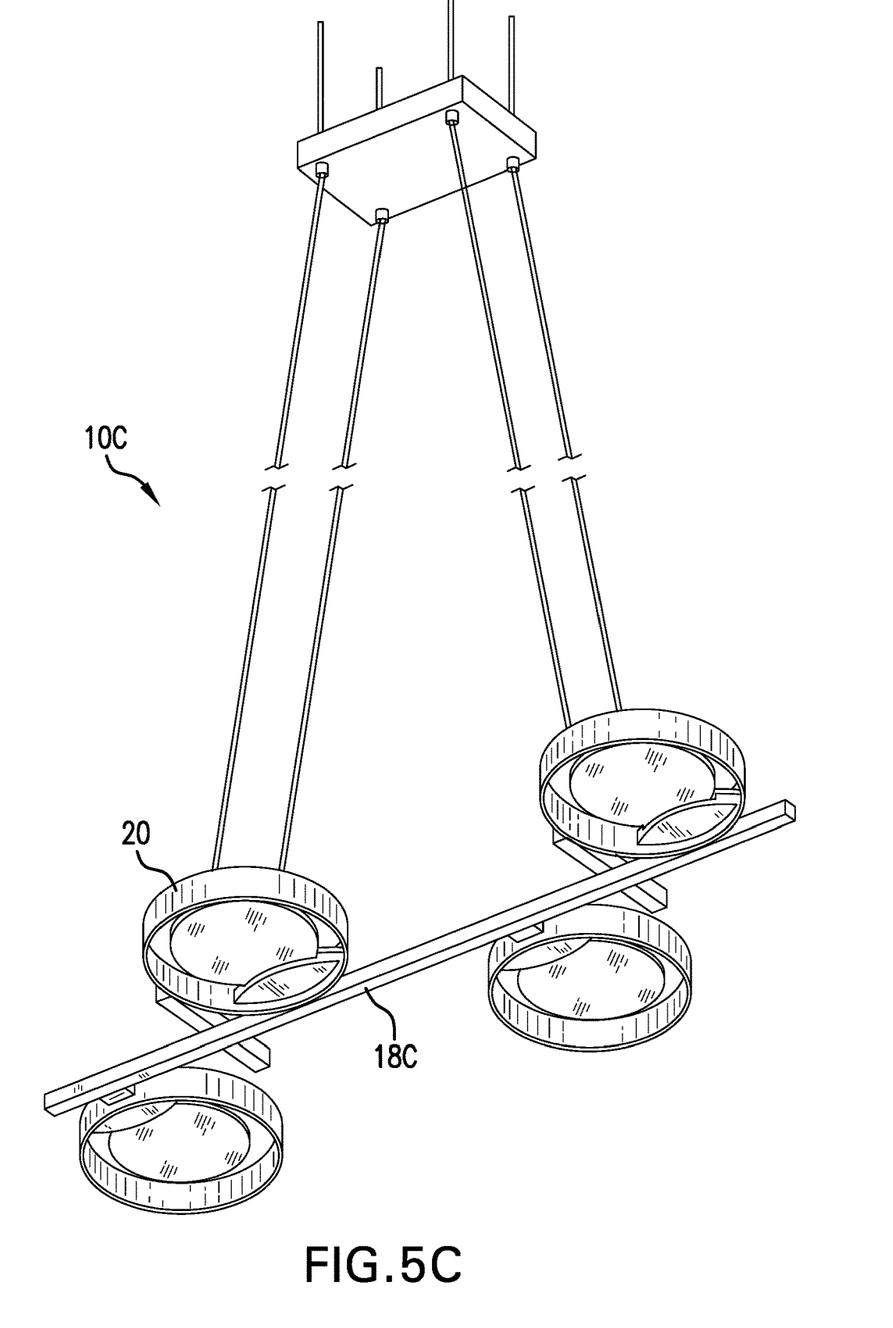

In FIG. 5C a pendant 10C is shown with four lights 20 in pairs along an elongated box 18C.

Figure 5D:
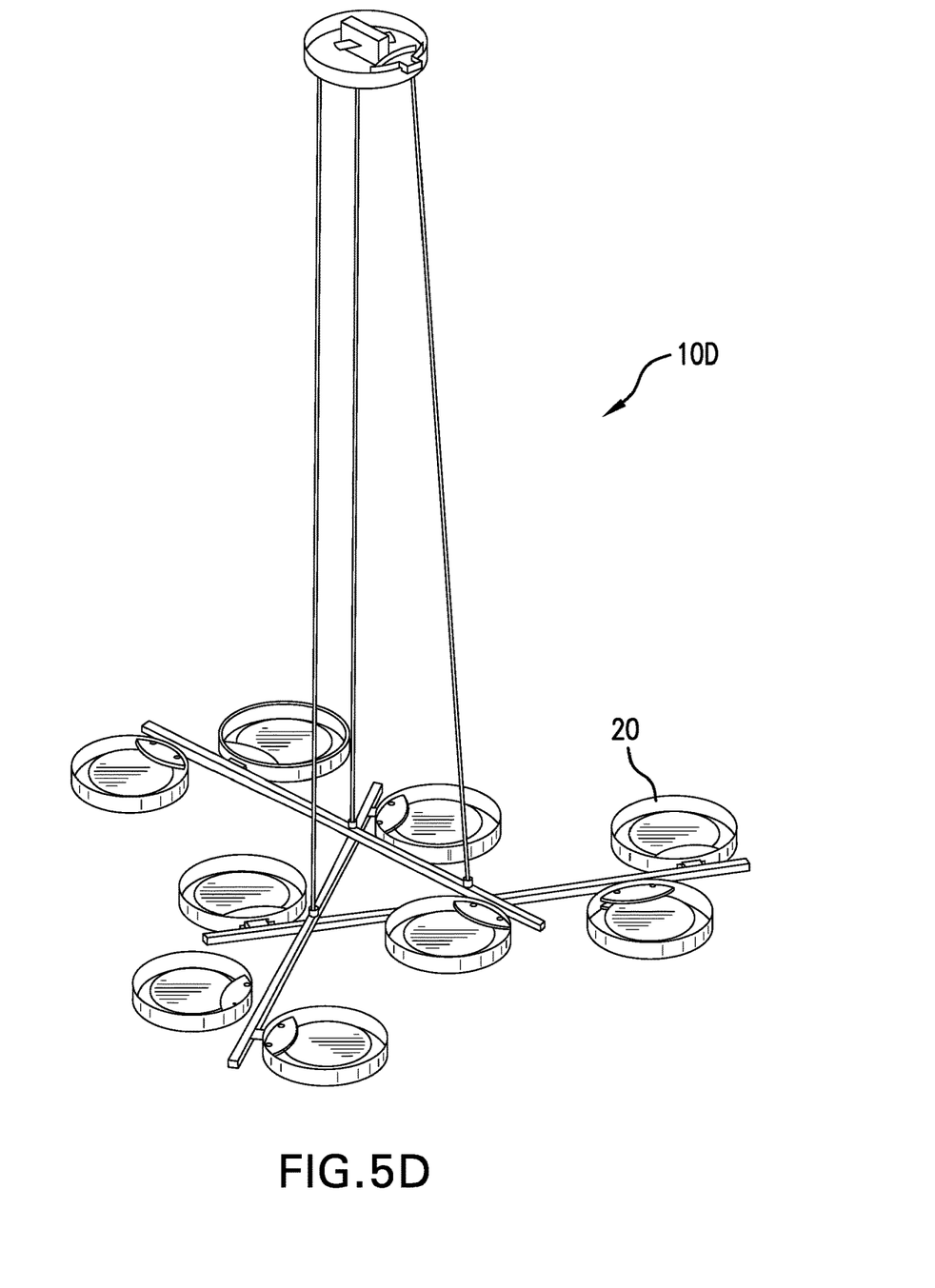

In FIG. 5D a pendant 10D is shown with nine lights 20 disposed in a pattern.

The light 20 may also be used in wall mounted pendants, sconces, etc.

Numerous modifications may be made to this invention without departing from its scope as defined the appended claims.

What is claimed is:

1. A light, comprising:
a circular rim extending continuously about an axis and having an inner surface defining an internal space;
a housing attached to the inner surface of said rim such that said housing is at least substantially disposed within said internal space of said rim;
a light source disposed inside said housing and arranged to selectively generate a beam of light; and
a lens disposed and supported in said internal space of said rim by said housing, said lens having a first lateral surface and a second lateral surface delimiting an outer periphery of said lens, said first lateral surface being concave and transparent and being positioned to receive said beam of light and said second lateral surface being convex and concentric with said circular rim.

2. The light of claim 1 wherein said housing has a lateral opening and said lens extends though said lateral opening with said first lateral surface disposed adjacent to said light source.

3. The light of claim 2, wherein said lens includes a house engaging member, said housing engaging member being arranged in said housing.

4. The light of claim 1, wherein said lens includes a top surface and a bottom surface.

5. The light of claim 4, wherein one of said top and bottom surfaces is formed with dimples intercepting at least a portion of said light beam and reflecting light away from said lens.

6. The light of claim 1, further comprising a printed circuit board with a vertical surface and being disposed in said housing, said printed circuit board being formed with a plurality of LED lights directing light beams through said first lateral surface into said lens.

7. The light of claim 1, wherein said lens second lateral surface is cylindrical.

8. A light, comprising:
a circular rim extending continuously about an axis and having an inner surface;
a housing attached to the inner surface of said rim, inside said inner surface such that said housing is at least substantially disposed within an internal space of said rim and including a plurality of light sources arranged in an arcuate configuration; and
a lens attached to said housing and including a major vertical surface disposed concentrically with respect to said inner surface and entirely within said internal space and a minor surface having a concave shape complementary to the arcuate configuration of said light sources, said minor surface being clear to receive light from said light sources,
wherein light beams from said light sources enters through said minor surface and travel to said major surface to generate an edge effect.

9. The light of claim 8, wherein said inner surface is reflective.

10. The light of claim 8, further comprising a printed circuit board with said light sources being disposed on said printed circuit board.

11. The light of claim 10, wherein said light sources are LEDs.

12. The light of claim 8, wherein said lens includes an upper and a lower surface, said surfaces being formed with dimples directing light from said light source upwardly and downwardly from said lens.

13. The light source of claim 8, wherein said lens is formed with ears attaching said lens to said housing.

* * * * *